March 4, 1924.    1,485,558
DE WITT C. HARRIS
TYPEWRITER ACTION
Filed March 22, 1922    2 Sheets-Sheet 1
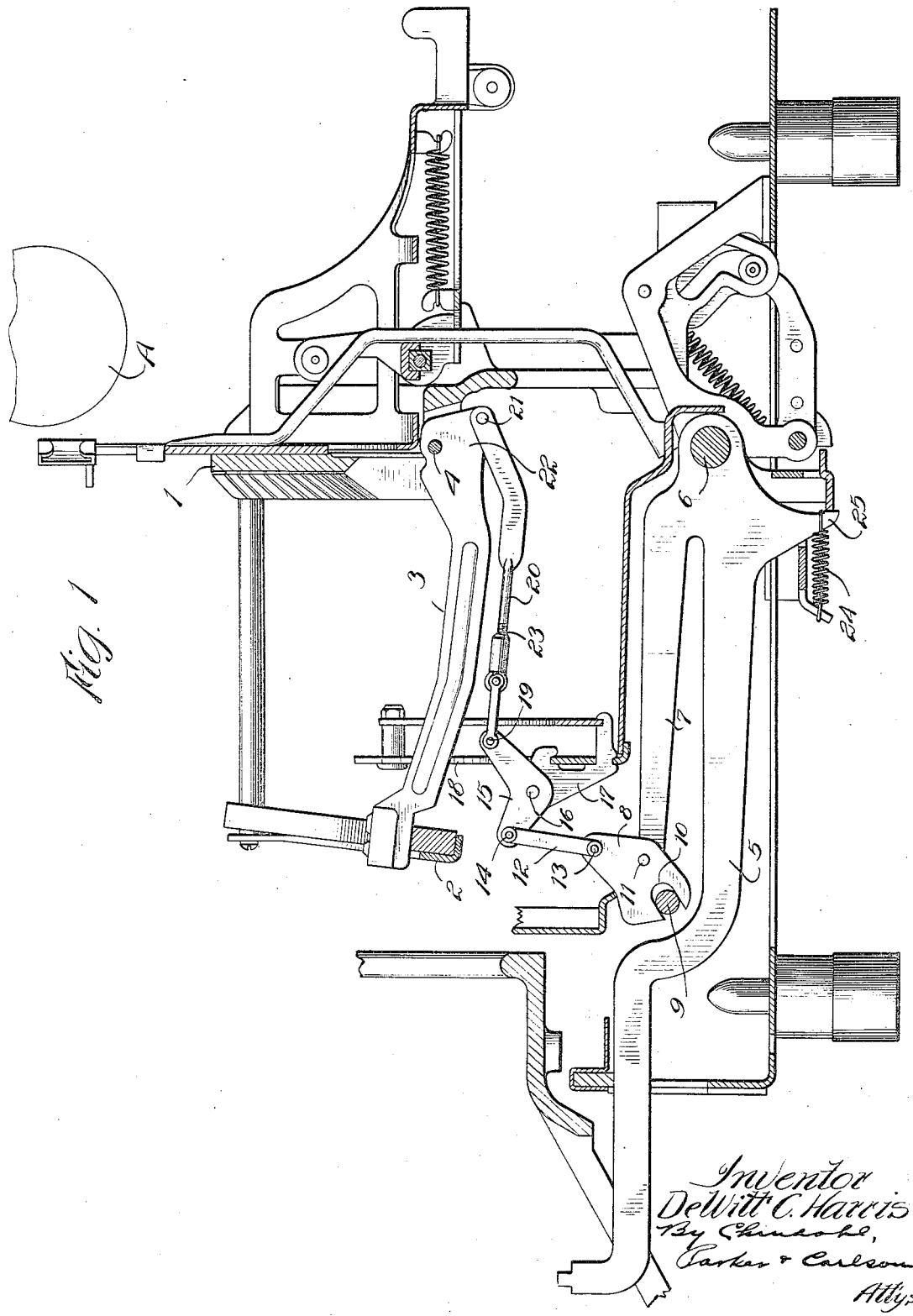

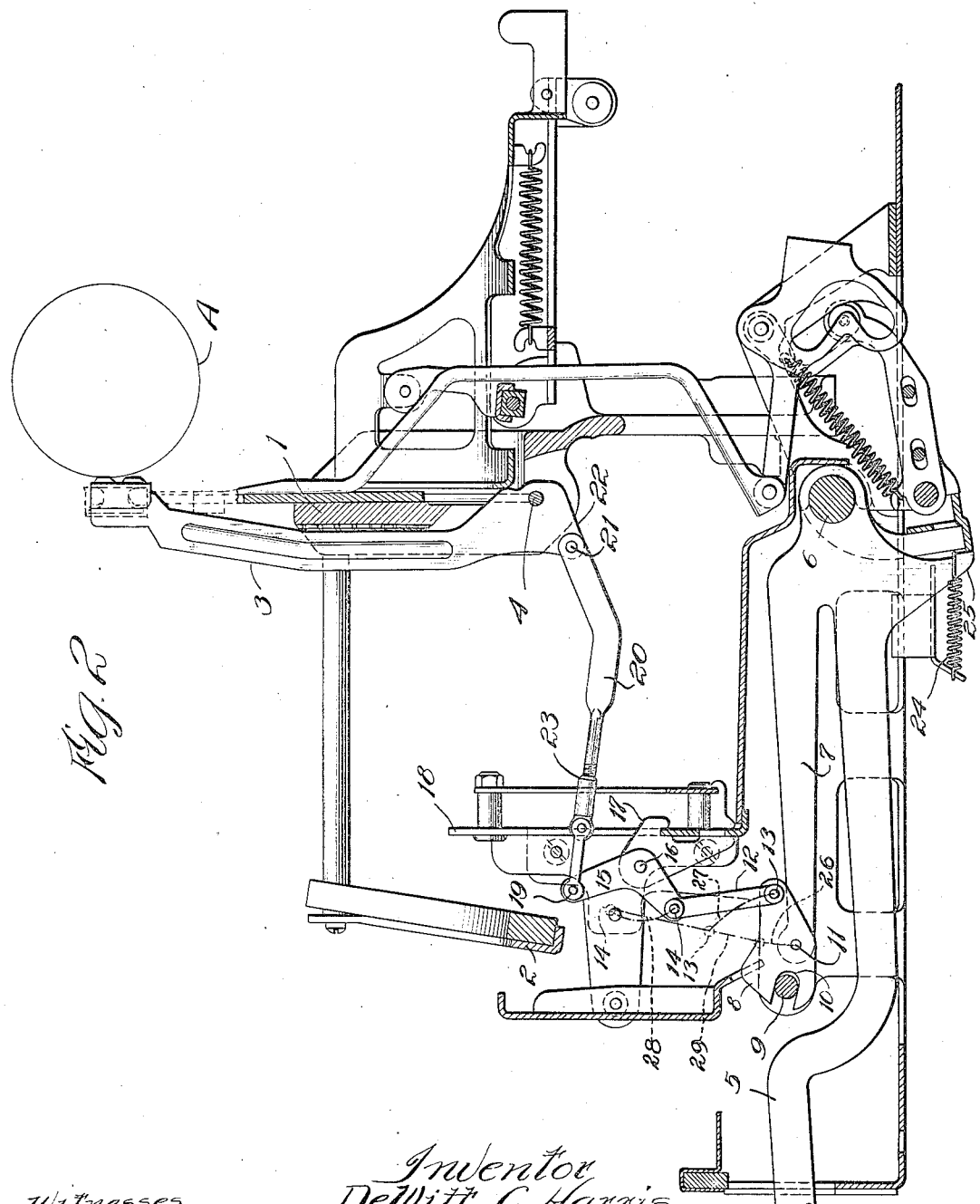

Patented Mar. 4, 1924.

1,485,558

UNITED STATES PATENT OFFICE.

DE WITT C. HARRIS, OF PINELAND, FLORIDA.

TYPEWRITER ACTION.

Application filed March 22, 1922. Serial No. 545,646.

*To all whom it may concern:*

Be it known that I, DE WITT C. HARRIS, a citizen of the United States, residing at Pineland, in the county of Lee and State of Florida, have invented certain new and useful Improvements in Typewriter Actions, of which the following is a specification.

This invention relates particularly to improvements in the operating connection between the key lever and the type bar, the general object of the invention being to provide a connection of such character as will permit of starting the type bar toward the platen easily and accelerating the typebar as it approaches the platen. Incidental features of improvement will become apparent as the description proceeds.

In the accompanying drawings, Figure 1 is a longitudinal central sectional view of a typewriter embodying the features of my invention, the type bar being shown at rest. Fig. 2 is a similar view, but showing the type bar in engagement with the platen.

For the purpose of imparting an understanding of the invention, I have herein shown it as embodied in a front-strike typewriter of the character illustrated and described in my copending application, Serial No. 541,930, filed March 8, 1922, but it will be understood that the invention herein claimed is applicable to typewriters of widely differing characteristics.

The type-bar support comprises a segment 1 and an arcuate rest or cushion 2 rigidly secured together and suitably guided for vertical reciprocation. The type bars 3 are arranged in a curved series and are pivoted to the segment in any suitable manner at 4. A is the platen.

The key levers 5 are pivoted at their rear ends in a suitable manner, as, for example, upon a rod 6. The key levers are of the cleft type, that is to say, each has an arm 7 extending forwardly from its rear portion. The means for connecting the arm 7 to the type bar 3 comprises a lever 8 mounted to shift on the fulcrum. While various means might be employed to provide the lever 8 with a shiftable connection on the fulcrum, there is herein shown a pivot rod 9 which lies within a notch or slot 10 in the lower portion of the lever 8. When in its normal or initial position, the lever 8 extends upwardly and rearwardly from the pivot rod 9. The arm 7 is pivoted to the lever 8 at a point 11 intermediate the ends of said lever. To the upper end of the lever 8 is pivoted the lower end of a link 12, the pivot point being indicated at 13. The upper end of the link 12 is pivoted at 14 to the forward arm of the bell crank lever 15. The bell crank lever 15 may be pivotally supported at 16 in any suitable manner. Herein, it is shown as mounted upon a clip 17 attached to and extending forwardly from a stationary segment 18. To the rear arm of the bell crank lever 15 is pivoted at 19 the forward end of a link 20, the rear end of said link being pivoted at 21 to the rearwardly extending heel 22 of the type bar 3. While the length of the link 20 may be adjusted in any suitable way during the process of assembling the machine, said link may, if desired, comprise two sections having a screw-thread connection at 23.

Any preferred means may be employed to restore the action to initial position after operation. The means herein shown for this purpose includes a coiled contractile spring 24 connected at one end to an arm 25 extending downwardly from the rear portion of the key lever 5, the forward end of said spring being anchored to a suitable stationary part.

The particular action shown in the drawings is one of the centrally located actions. In the remaining actions, the links 12 increase regularly in length as the series approaches the ends of the segment.

When it is desired that the main bodies of the key levers 5 shall be parallel, the difference between the width of the series of key levers and that of the series of typebars may be compensated for by causing the arms 7 to converge toward the front of the machine, so that each set of elements 8, 12 and 15 may occupy a vertical plane.

The operation is as follows: When the key lever is depressed, the lever 8 is caused to swing downwardly and rearwardly, as shown by a comparison of Figs. 1 and 2. As the pivot point 11 descends, the distance between said point and the pivot rod 9 decreases, thus causing the lever 8 to slide upon the pivot 9. The shortening of the distance between the pivots 9 and 11 decreases the leverage and thus accelerates the downward movement of the pivot point 13, whereby the rate of movement of the type bar increases as it approaches the platen A.

When the type bar is in its initial position, the pivot points 11, 13 and 14 are approximately in alinement. Therefore, the downward and rearward movement of the lever 8 at first causes comparatively little movement of the type bar, but after the inertia of the type bar has been overcome the continuing downward swing of the lever 8 causes progressively faster movement of the pivot pin 14 and consequently of the type bar. Thus, it will be readily seen that the type bar is set in movement with the maximum leverage of the lever 8, the type bar moving correspondingly slowly at the beginning of the depression of the key lever; and that as the inertia of the parts is overcome the leverage decreases and the speed of the type bar increases. The employment of the shiftably-mounted lever 8 permits of using a longer heel 22 and a larger bell-crank lever 15 than would otherwise be practicable, and thus contributes to ease and lightness of operation. It will also be evident that the link 12 and the portion of the lever 8 between the pivots 11 and 13 constitute a pair of toggle links and form a toggle-jointed draw connection between the bell-crank 15 and the key lever. The lower portion of the lever 8 may be considered an extension having a slot. The joint 13 in said draw-connection is normally in the approximate line of pull between the key lever and the pivot 14.

The dot-and-dash lines 26, 27, 28 in Fig. 2 represent the paths of the pivoted points 11, 13 and 14. It will be seen that the travel of the pivot 11 is much shorter than the travel of the point 13. It will also be noted that the point 13 swings rearwardly with the point 14. The last-mentioned feature insures better manifolding power, because the leverage applied to the type bar as it approaches the printing point is more favorable than as though the actuating joint 13 moved in the line of pull indicated by the dot-and-dash line 29 in Fig. 2.

I claim as my invention:

1. A front-strike typewriter having, in combination, a type bar, a forwardly extending link connected to the heel of the type bar, a bell crank lever having its rear arm connected to said link, a downwardly extending link connected at its upper end to the forward arm of the bell crank lever, a lever connected at its upper end to the lower end of the second link, a key lever connected to the last-mentioned lever intermediate the ends of the latter, the second-mentioned lever having a slot in its lower portion, and a pivot extending through the slot.

2. A front-strike typewriter having, in combination, a type bar, a forwardly extending link connected to the heel of the type bar, a bell crank lever connected to the forward end of said link, a downwardly extending link connected to the bell crank lever, a lever mounted to shift on its fulcrum at one end and connected at its other end to the lower end of the second link, and a key lever connected to the last mentioned lever intermediate the ends of the latter.

3. A front-strike typewriter having, in combination, a type bar, a forwardly extending link connected to the heel of the type bar, a bell crank lever having its rear arm connected to said link, a downwardly extending link connected to the forward arm of the bell crank lever, a lever pivoted at one end and connected at its other end to the lower end of the second link, and a key lever connected to the last mentioned lever intermediate the ends of the latter.

4. A typewriter having in combination, a key lever having a forwardly-extending arm, a type bar, and connections between said arm and the type bar, said connections including a lever connected intermediate its ends to said arm, the upper end of the second-mentioned lever being operatively connected to the type bar, the lower end of the second mentioned lever being slotted, and a pivot extending through said slot and located forward of said arm.

5. A typewriter having, in combination, a key lever having a forwardly-extending arm, a type bar, and connections between said arm and the type bar, said connections including a lever mounted at one end to shift on the fulcrum and connected intermediate its ends to said arm, the other end of the second-mentioned lever being operatively connected to the type bar.

6. A typewriter having in combination, a typebar, a key lever and a connection between same comprising a bell crank lever, a link between the bell crank lever and said typebar, a toggle-jointed draw connection between said bell crank and said key lever, the joint in said draw connection being normally in approximate line of pull between said key lever and the connecting point to said bell crank, and means for throwing said toggle joint out of said approximate line of pull and away from same after the depression of said key lever shall have started, said movement of said toggle joint away from said line of pull being accelerated during the depression of said key lever, comprising an extension from said toggle connection having therein a slot, and a fulcrum to cooperate with said slot.

7. A typewriter having in combination, a key lever, a typebar, a bell crank connected to said typebar, a lever pivotally mounted intermediate the ends thereof, on said key lever, a link pivotally connected to one end of said pivoted lever and extending to said bell crank in the approximate line of said pivotal point of said pivoted lever and the point of attachment to said bell crank, and means for swinging said pivotally mounted lever during the depression of said key lever, comprising a fulcrum lying within a slot in said pivoted lever.

8. A typewriter having in combination, a typebar, a key lever and a connection between the same comprising a lever pivotally mounted intermediate the ends thereof on said key lever, a link extending from one end of said pivoted lever to connect operatively with said typebar in a direction in approximate line with said pivotal point on said key lever and means for swinging said pivotally mounted lever during the depression of said key lever comprising a fixed fulcrum lying within a slot in said pivotally mounted lever.

9. A typewriter having in combination, a typebar, a key lever, a connection between the same comprising a lever pivotally mounted intermediate the ends thereof on said key lever, a link extending from one end of said pivoted lever to connect operatively with said typebar in a direction in an approximate line with the pivotal point on said key lever, and means for swinging said pivoted lever during the depression of said key lever comprising a fulcrum to cooperate with the other end of said pivoted lever.

10. A typewriter having, in combination, a key lever and type bar, and an actuating jointed draw connection between said key lever and said type bar, said draw connection having an intermediate joint which is adapted to move approximately in a line connecting the remote ends of said draw connection during the first portion of the depression of said key lever, and means consisting of a fulcrum and a slotted extension from said draw connection cooperating with said fulcrum for causing said joint to swing out of said line during the balance of the depression of said key lever.

In testimony whereof, I have hereunto affixed my signature.

DE WITT C. HARRIS.